United States Patent [19]

Salva et al.

[11] 4,118,658
[45] Oct. 3, 1978

[54] CONTROL CIRCUIT FOR SHUTTLE CAR

[75] Inventors: John P. Salva, Shelton; Gregory M. Mudzinski, Stamford; John A. Mills, Norwalk, all of Conn.; Shashi B. Dewan, Toronto, Canada

[73] Assignee: Firing Circuits Inc., Norwalk, Conn.

[21] Appl. No.: 790,304

[22] Filed: Apr. 25, 1977

[51] Int. Cl.$^2$ ............................................. H02M 7/68
[52] U.S. Cl. ................................ 318/257; 318/345 G
[58] Field of Search ............... 318/257, 345 G, 345 R, 318/306, 336, 339, 268

[56] References Cited

U.S. PATENT DOCUMENTS

| | | | |
|---|---|---|---|
| 3,539,904 | 11/1970 | Brown | 318/257 |
| 3,594,629 | 7/1971 | Kawakami | 318/345 G |

*Primary Examiner*—Herman J. Hohauser
*Attorney, Agent, or Firm*—Wooster, Davis & Cifelli

[57] ABSTRACT

A control circuit for use with a shuttle car used in mining operations and circuitry associated therewith. The control circuit generally comprises a chopper circuit in series with a reversing circuit and a traction motor which drives the shuttle car. The chopper circuit essentially comprises two separate current paths each through a separate set of silicon controlled rectifiers or SCRs and a common capacitor. A logic circuit controlled by the operator alternately gates the sets of SCRs thereby placing voltage across the traction motor. The magnitude of this voltage and hence the speed of the motor are directly proportional to the frequency of the gating pulses. The reversing section also employs two sets of SCRs and a common field inductance. The operator, through the logic circuit, triggers one set of SCRs and current flows through the field inductance in a forward direction causing the traction motor to operate in a forward mode. When the second set of SCRs are triggered, the current through the field inductance is reversed, and accordingly, the current through the motor will also be reversed causing it to reverse direction. Consequently, the chopper circuit controls the car's speed while the reversing circuit controls its direction. The control circuit is also provided with a power circuit which creates the voltage for the logic circuit as well as a pump motor circuit which controls the car's hydraulics and a conveyor motor circuit which controls the loading and unloading functions.

19 Claims, 7 Drawing Figures

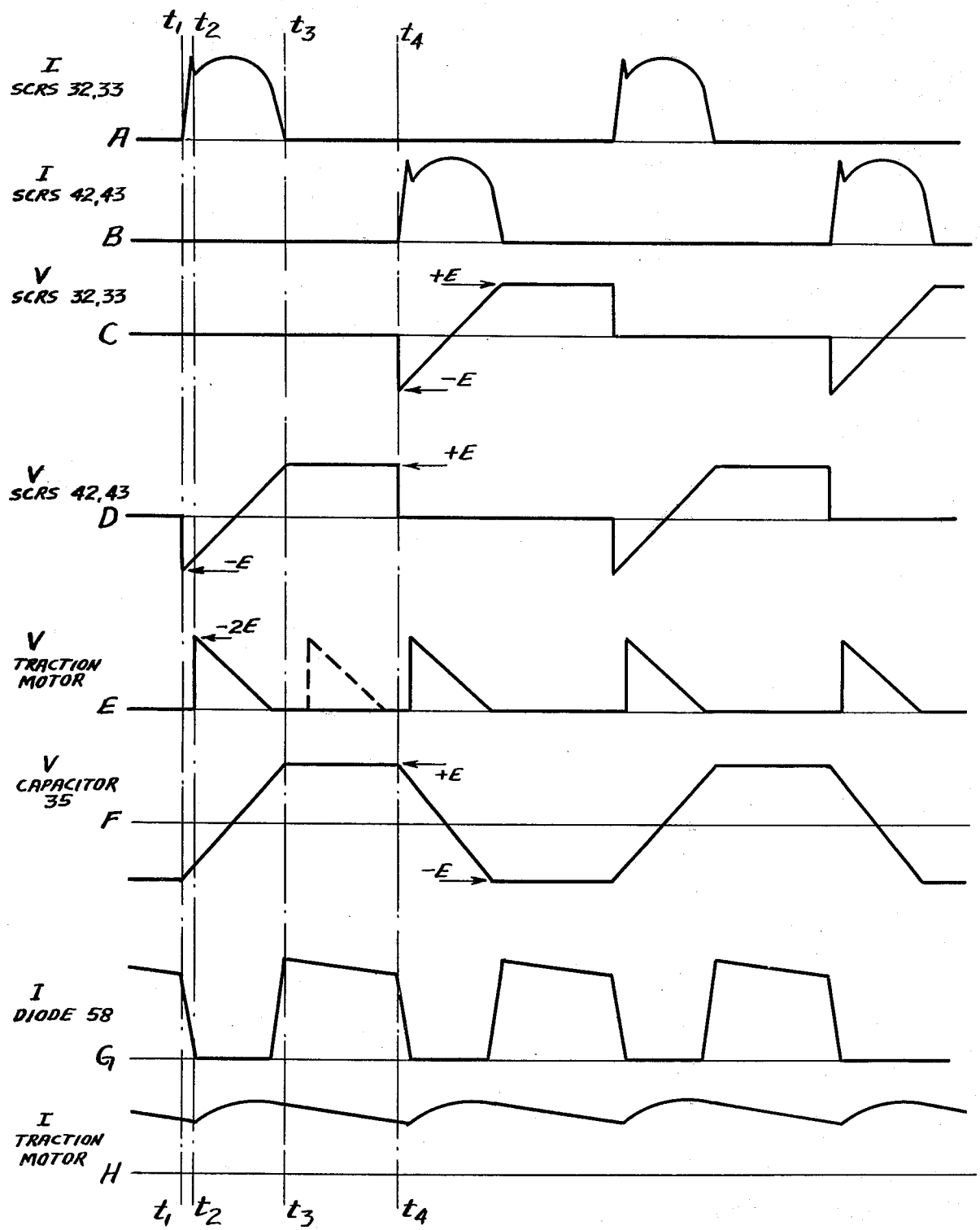

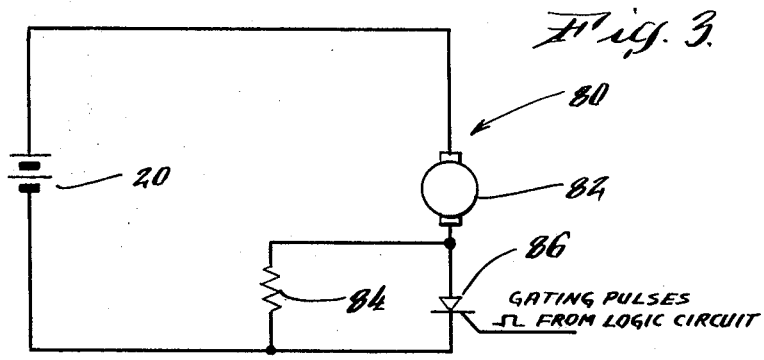

CONTROL CIRCUIT FOR SHUTTLE CAR

BACKGROUND OF THE INVENTION

This invention relates to a control circuit and an associated power circuit for use with a mine shuttle car.

Mine shuttle cars are used in mining operations in general principally to transport coal or other mined materials. Due to the nature of this type of operation, the particular shuttle cars must function without producing any sparks which might cause fires or explosions. Consequently, the prior art shuttle cars generally operated from a cable which powers a DC traction motor.

The traction motors of the prior art shuttle cars were generally controlled by some form of a hand control knob. The control circuitry associated with them generally consisted simply of a series of resistors arranged in series with the traction motor. When the hand control was turned up to increase the speed, one or several of the resistors would drop out of the circuit thereby increasing the voltage across the motor and increasing its speed. Similarly, the reduction in speed was accomplished by turning the hand control so that one or more of the resistors were reinstated in the series circuit. These quantum jumps, however, do not produce a continuous flow of current to the traction motor. Consequently, the prior art control circuits necessarily placed an undue strain on the drive shaft and other mechanical devices associated with the shuttle car. As a further maintenance problem, the contacts in the hand control have a tendency to wear out and have to be replaced frequently. And finally, the amount of control the operator has over the speed of the motor is understandably somewhat limited by this type of control circuit. Nevertheless, despite these drawbacks, these shuttle cars with the prior art control circuits are widely used.

SUMMARY OF THE INVENTION

The improved shuttle car control circuit according to the invention herein is of solid state design and more reliable than that found in the prior art shuttle cars. The improved control circuit comprises six basic elements; a chopper circuit which controls the speed of a traction motor driving the car, a reversing section which controls the direction of the motor, a pump circuit which controls the shuttle car hydraulics, such as the braking system, a conveyor circuit which controls the conveyor motor associated with the shuttle car's loading and unloading functions, a logic circuit and a power supply circuit to furnish the logic elements with the correct voltage.

The chopper section is essentially two parts which are comprised of two pairs of series connected silicon controlled rectifiers or SCRs connected in parallel. A commutation capacitor is connected across this bridge thereby creating a path from the first SCR on one side through the capacitor to the second SCR on the opposite side. Two such paths are created. In actual operation, each of the pairs of SCRs are alternately triggered. As the frequency at which the SCRs are triggered increases, the average voltage level to the traction motor which is series connected to the chopper circuit also increases and accordingly the speed of the motor increases. As the traction motor is shunted by a free wheeling diode, current through the motor is maintained when the commutation capacitor of the chopper circuit is fully charged, and there is no conduction through the chopper circuit.

The traction motor is also series connected with a reversing section between the motor and the chopper section. The reversing section is generally comprised of two pairs of SCRs connected in series, and as with the chopper circuit, both the pairs are connected in parallel. A field inductance is connected across the junction of the two pairs. Consequently, the current through the field in one directin will cause the armature of the motor to rotate in a forward direction while the current through the field in the opposite direction causes the armature of the traction motor to rotate in the reverse direction. As with the chopper section, alternating SCRs are fired, and the current from the chopper circuit or the free wheeling diode always passes through the field inductance. The direction of the flow depends upon which set of SCRs are triggered. The SCRs of the reversing circuit remain triggered until the operator of the shuttle car desires to change the direction of the car, and activates the logic which triggers the alternate SCRs of the reversing circuit.

A pump motor is provided to control the hydraulics, such as the steering and braking mechanism of the shuttle car, and the pump motor is always on once the car is in operation. At start-up condition, however, the current to the pump motor is very large as there is no counter emf developed as yet. Consequently, a start-up resistor is provided in series with the pump motor to limit the current to the motor at start up. An SCR is connected in parallel with this start-up resistor, and after a sufficient period of time, it is gated thereby dropping the resistor out of the circuit, and placing full line voltage across the pump motor. Consequently, the pump motor and associated circuitry is protected under start-up conditions.

A conveyor motor is included which also has a series connected start-up resistor and an SCR which drops the resistor out of the circuit after a sufficient start-up time has elapsed. In addition, however, a current path is created at start-up through the start-up resistor and another SCR which is series connected to the start-up resistor. At the same time, this charges a capacitor. When the SCR associated with the start-up resistor is turned on, the resistor is shorted out and line voltage will be across the conveyor motor. The conveyor motor is shut down by turning off both the SCR shunting the start-up resistor and the SCR in series with the start-up resistor. At the same time, a third SCR, which is in series with the charged capacitor, is fired and the capacitor discharges through this SCR. This serves to reverse bias the SCR in series with the start-up resistor permitting it to regain gate control.

The power supply is also solid state and generates a plus or minus 24 volts DC from the 300 volt line voltage which is supplied by cable. This plus or minus 24 DC is used for the logic circuits associated with the SCRs and for also developing the regulated plus or minus 15 volts DC for the same circuitry. The power circuit generally comprises a charging capacitor which is fed from the line voltage, and at start-up condition this creates a 15 volt level on the cathode of the third in a series of zener diodes. This 15 volts supplies the power circuit logic and a unijunction transistor which is configured to operate as an oscillator. This oscillator in turn feeds a one shot multivibrator which passes its output signal to two separate series of transistors tied into the ends of the primary of center tapped transformer. Because of the nonsyncronous outputs of the respective sets of transistors, an alternating voltage of approximately 300 volts DC is generated on this primary. This voltage is then stepped down by the secondary and full wave rectified to produce the plus and minus 24 volts DC for the logic. At the same time, the transformer also serves to generate a plus 15 volt level which is filtered by a capacitor and placed back into the power circuit logic to maintain a current flow through the zener diodes. Consequently, the plus 15 volts continues to be available for logic elements of this circuit even after start-up condition is over.

Accordingly, a principal object of the present invention is to provide a control circuit for a shuttle car which is reliable and more dependable than known circuits.

Another object of the present invention is to provide a control circuit which operates the shuttle car without requiring a great deal of maintenance.

Another object of the present invention is to provide a means for easily controlling the operation of the shuttle car.

Other and more specific objects of the invention will in part be obvious and will in part appear from the following description of the preferred embodiments and claims taken together with the drawings.

DRAWINGS

FIG. 2 is a comparison graph of current and voltage waveforms at various points in the circuit of FIG. 1.

FIG. 3 is a circuit diagram of the pump motor circuit.

FIG. 4 is a circuit diagram of the conveyor motor circuit.

FIG. 6 is a comparison graph of waveforms at two points in the power circuit.

FIG. 7 is a comparison graph of waveforms in the power circuit.

The same reference numbers refer to the same elements throughout the various FIGS.

DESCRIPTION OF THE PREFERRED EMBODIMENTS

Figure 1:
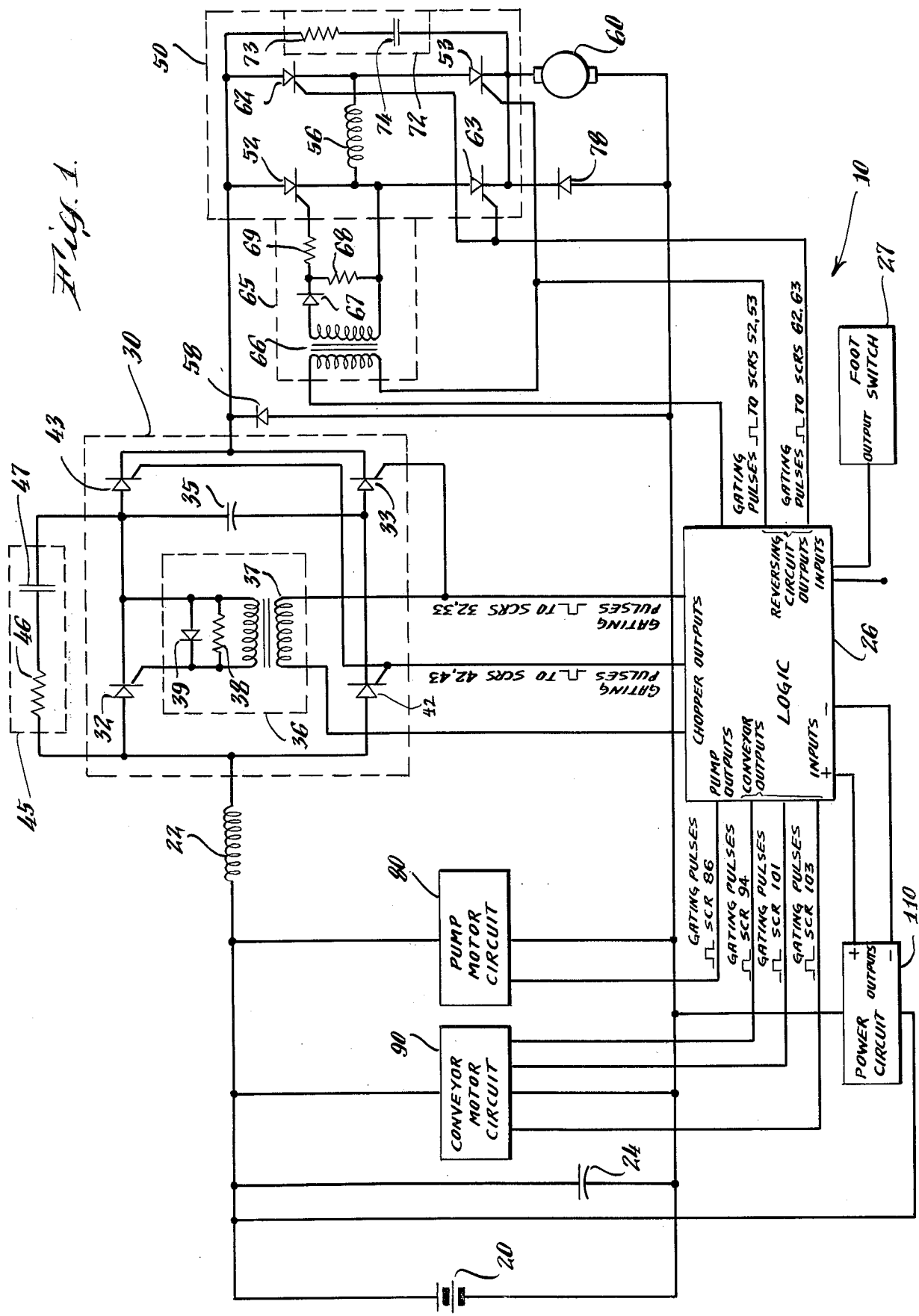
FIG. 1 is a circuit diagram of this invention.

Referring now to FIG. 1, a circuit according to the invention herein is shown at 10. The circuit 10 generally comprises a power supply 20 in series with a first inductance 22, a chopper circuit 30, a reversing circuit 50 and a traction motor 60. A filter capacitor 24 is connected across the power supply 20 which generally produces about 300 volts.

The chopper circuit 30 is generally comprised of a pair of series connected silicon controlled rectifiers or SCRs connected in parallel with another pair of series connected SCRs. As shown in FIG. 1, a first SCR 32 has its anode connected to the first inductance 22 opposite the power supply 20 and its cathode connected to the anode of a second SCR 43. Similarly, a third SCR 42 has its anode connected to the anode of the first SCR 32. The cathode of the third SCR 42 is in turn connected to the anode of a fourth SCR 33. The cathodes of SCRs 33, 43 are connected. A commutation capacitor 35 is connected across the chopper circuit 30. One end of the capacitor 35 is connected between SCRs 32, 43 while the other end of the capacitor is connected between SCRs 42, 33.

The chopper circuit 30 operates in the following manner. SCR 32 and SCR 33 are triggered at the same time by gating pulses from a logic circuit 26 making the SCRs 32, 33 conductive. These SCRs 32, 33 conduct only long enough for the capacitor 35 to discharge through the load and to recharge. Once the capacitor 35 is recharged again through SCRs 32 and 33, there is no current flow from the chopper circuit 30 to the traction motor 60 and gate control to the SCRs 32, 33 is restored. Therefore, SCR 33 essentially provides a path to the motor 60 for the capacitor's 35 discharge current while SCR 32 recharges the capacitor 35 in the opposite polarity from its original charge. On the second cycle, the opposite pair of SCRs 42, 43 are triggered by the gating pulses. The capacitor 35 again discharges and charges to the opposite polarity, this time through SCR 42 and 43, and the current from the power supply 20 through SCR 42 charges the capacitor 35 in the same polarity as it had before the initial gate.

The timing sequence can best be explained with reference to the graphs of FIG. 2. In graph A, the current I for SCRs 32, 33 is shown. At time $T_1$ when the SCRs 32, 33 are triggered by the proper pulse from the logic circuit 26, the commutation capacitor 35 begins to discharge, and the rate of current begins to rise. The rate of current rise, di/dt, is limited by the first inductance 22. As shown in graph B, there is no current flow at this time through SCRs 42, 43 which have not yet been triggered and are therefore nonconductive. Because SCRs 32, 33 are now conductive, there is no voltage buildup across them as shown in graph C while the corresponding pair of SCRs 42, 43 have a voltage of $-E$, as shown in graph D. At the same time, the voltage across the commutation capacitor 35 begins to discharge through SCRs 32 and 33 and fall toward zero from its fully charged level of $-E$ as seen in graph F. At time $T_2$, the voltage across the traction motor 60 has now built up to a spike with a height of $+2E$ volts as shown in graph E. At the end of the first cycle indicated by time $T_3$ on the graphs of FIG. 2, SCRs 32, 33 have ceased conduction and have turned off due to the characteristics of these devices that after they are gated they will continue conducting until current flow ceases. When it ceases, they will build up a blocking voltage and not conduct until regated. In this chopper circuit 30, one cycle of operation effectively reverse biases the other pair of SCRs. The commutation capacitor 35 has now fully recharged to a $+E$ level as shown in graph F. Subsequently, at time $T_4$, the second set of SCRs 42, 43 are triggered and the sequence repeats. Accordingly, as the frequency at which the gating pulses to the respective sets of SCRs 32, 33 and 42, 43 is increased, the voltage spikes of the traction motor 60 come closer together as shown in graph E by the dotted lines. This increases the average voltage level to the traction motor 60, and, consequently, causes the traction motor 60 to increase in speed. Conversely, a lower frequency of SCR gating will cause the traction motor 60 to run more slowly due to the decreased voltage level.

As shown in FIG. 1, a protection circuit 36 is provided for SCR 32. The protection circuit 36 comprises a transformer 37 which provides the logic circuit 26 with noise protection as well as DC isolation from the main circuit 10. The gate of the SCR 32 is connected to one side of the secondary of the transformer 37 while the other side of the secondary is connected to the cathode. The triggering pulse from the logic circuit 26 is sent to the primary of the transformer 37 which induces a signal in the secondary thereby gating the SCR 32. A resistor 38 and a diode 39 are shunted across the secondary of the transformer 37. The diode 39 eliminates back biasing while the resistor 38 increases the *dv/dt* capability of the device and provides another shunt path for the cathode and gate. This serves to decrease the turnoff time of the SCR. Each of the other SCRs 33, 42, 43 of the chopper circuit 30 has an identical protection circuit (not shown) which operates in the same manner.

SCR 32 also has a snubber circuit 45 connected in parallel across its cathode and anode. The snubber 45 is comprised of a resistor 46 in series with a capacitor 47 and provides a path for reverse recovery current which is actually current through the SCR 32 in a reverse direction which is caused by the placing of the reverse voltage across the device. Without the snubber 45, a very high voltage could develop across the SCR in a reverse direction and the magnitude of this voltage could be enough to destroy it. The snubber 45, however, provides a low impedance path which limits the magnitude of this reverse voltage. At the same time, the snubber 45 also serves to reduce device losses during a reverse recovery period for the SCR. The other SCRs 33, 42, 43 of the chopper circuit 30 are provided with identical snubber circuits which are not shown.

As also shown in FIG. 1, the logic circuit 26 is connected, as previously explained, through a protective circuit to the gates of each of the SCRs 32, 33, 42, 43 of the chopper circuit 30. The logic circuit 26 is controlled by a foot pedal 27. In the neutral position, the foot pedal 27 inputs a zero voltage level to the logic circuit 26, and with this zero input, no gating pulses are produced for the SCRs 32, 33, 42, 43 of the chopper circuit 30. Consequently, there is no current flow through the chopper circuit 30, and no voltage is applied to the traction motor 60. However, when the operator wishes to move the shuttle car, the foot pedal 27 is moved in either of two directions. This displacement from the neutral position of the foot pedal 27 causes a voltage level to be inputed to the logic circuit 26. This input voltage level is positive or negative depending upon the direction of the foot pedal 27 movement while the magnitude of the level of the voltage directly depends upon the magnitude of the displacement of the foot pedal 27. Accordingly, when the logic circuit 26 receives this voltage, it generates gating pulses to the respective pairs of the chopper circuit's SCRs 32, 33 and 42, 43. As previously explained, this will cause conduction through the chopper circuit 30 and create a voltage level on the traction motor 60 causing it to operate which thereby moves the car. As the magnitude of foot pedal movement increases, so does the input voltage level to the logic circuit 26. This increases the frequency of the gating pulses and, accordingly, as previously explained, the voltage level across the motor 60 will be increased, and it will operate at a higher speed.

As shown in FIG. 1, the traction motor 60 is connected in series with the chopper circuit 30 as well as a field inductance 56. A free wheeling diode 58 is connected in parallel across the field inductance 56 and the traction motor 60. The diode 58 maintains the current to the traction motor 60 when the commutation capacitor 35 of the chopper circuit 30 is not discharging. This current through the free wheeling diode 58 is created as part of an RL circuit which is formed by the loop consisting of the diode 58, the field inductance 56 and the motor 60 when the motor's own inductance acts like a current source between current pulses from the chopper circuit 30. This current $I_D$ is illustrated in graph G of FIG. 2. This graph G can be compared with graphs A and B which show the current through the respective SCRs of the chopper circuit 30 and which combined show the total current from the chopper circuit 30. As a result, the actual current to the traction motor 60 is a combination of graphs A, B and G of FIG. 2 and shown in graph H. It is a combination of the current flowing through each pair of the SCRs 32, 33 and 42, 43 of the chopper circuit 30, and when that current is nonexistent, the current $I_D$ through the free wheeling diode 58.

The traction motor 60 is also connected in series to a reversing section 50 which is comprised of two parallel pairs of series connected SCRs. The anode of a first SCR 52 is connected to the traction motor end of the chopper circuit 30. The cathode of the SCR 52 is connected to one end of the field inductance 56, and the anode of a second SCR 63. The cathode of the SCR 63 is connected to one side of the traction motor 60. A third SCR 62 is also connected so that its anode is attached to the traction motor end of the chopper circuit 30, and its cathode is connected to the side of the field inductance 56 opposite that of SCR 52. A fourth SCR 53 has its anode connected to the cathode of SCR 62. The cathode of SCR 53 is connected to the traction motor 60 and the cathode of SCR 63. This arrangement consequently forms a reversing bridge having two separate paths. The first is the path from SCR 52 through the field inductance 56 and to SCR 53. The alternate path is from SCR 62 through the field inductance 56 in the opposite direction as before and to SCR 63.

In operation, this reversing circuit 50 works in the following manner. As previously explained, the foot pedal 27 can be moved by the operator in either of two directions. When the operator wishes to go forward, the foot switch is moved in one direction, and a positive voltage of a magnitude proportionate to the amount of foot pedal displacement is inputed into the logic circuit 26. The logic circuit 26 thereupon triggers SCRs 52, 53 which are left on as long as some positive input voltage is received regardless of its magnitude. The current from the chopper circuit 30, therefore, flows through the field inductance 56 and the traction motor 60 turns. As long as the shuttle car operator wishes to continue in the forward direction, regardless of the speed of the car, this pair of SCRs 52, 53 will remain triggered, and the current to the traction motor 60 will continue to flow in this direction. However, if the operator wishes to reverse direction, he moves the foot pedal 27 in the opposite direction from neutral and a negative voltage of some magnitude will be applied to the input of the logic circuit 26. When the logic circuit reads this negative voltage, it turns off the forward set of SCRs 52, 53, and triggers the reverse set of SCRs 62, 63. The current from the chopper circuit 30 now flows through SCR 62, through the field inductance 56, and through SCR 63 and to the traction motor 60. The current, however, flows through the field inductance 56 in the opposite direction in this mode and, therefore, the current in the RL loop is reversed which causes the armature of the traction motor 60 to rotate in the opposite direction. Accordingly, the reversing circuit 50 controls motor direction while the chopper circuit 30 controls its speed.

As shown in FIG. 1, SCR 52 has an isolating circuit 65 which is comprised of a transformer 66. The primary of the transformer 66 receives the gating pulses from the logic circuit 26 thereby providing noise protection and DC isolation for the logic circuit 26. The secondary of the transformer 66 is connected to a diode 67 and a first resistor 68 is attached to the cathode of the diode 67 and shunted across the secondary of the transformer 66. The diode 67 eliminates back biasing, and the first resistor 68 increases the $dv/dt$ capability while providing another shunting path for the cathode gate of SCR 52. A second resistor 69 is connected from the cathode of the diode 67 to the actual gate of SCR 52 and an identical isolating circuit (not shown) is similarly connected to each of the other SCRs 53, 62, 63 of the reversing circuit 50. This second resistor 69 eliminates any gate drive differences on each of the sets of SCRs of the reversing circuit due to its magnitude.

A single snubber 72 is connected across the entire reversing circuit 50. The snubber is comprised of a resistor 73 and a capacitor 74 connected in series. Unlike the snubber 45 of the chopper circuit 30, the single snubber 72 of the reversing circuit 50 is used in the more traditional sense to limit the rate of rise, $dv/dt$, of the forward blockiing voltages for the SCRs 52, 53, 62, 63. If this voltage rises too rapidly, the SCRs can become conductive once again instead of going into a nonconductive state as is desired. As a result, a short circuit would occur through the reversing circuit 50 bypassing the inductive field 56 and thereby eliminating all motor direction control.

A plugging diode 78 is connected in parallel with the traction motor 60. The cathode of this plugging diode 78 is connected to the cathodes of SCRs 53, 63 while, as shown in FIG. 1, the anode of the plugging diode 78 is connected to the side of the traction motor 60 opposite the reversing circuit 50 and also connected to the anode of the free wheeling diode 58. This plugging diode 78 protects the circuit from damage when the operator changes the direction of the car. When the direction is changed, the traction motor 60 will act as a generator creating a large current. This high current would circulate in the loop through the free wheeling diode 58 and the chopper circuit 30 would then be required to feed this high current. This could result in damage to the chopper circuit 30. The plugging diode 78, however, prevents this situation by operating to confine this large current to the small loop consisting only of the plugging diode 78 and the traction motor 60 itself. Under normal operating conditions, the plugging diode 78 also will conduct whenever $di/dt$ of the armature of the traction motor 60 is negative.

At this point, it should be noted that the circuit 10 of FIG. 1 can be altered to include a double traction motor arrangement by adding a second reversing section, traction motor and plugging diode. Along the same line, it is also possible to add additional traction motors in the same manner.

As shown in FIG. 1, a pump motor circuit 80 is connected across the power supply 20. The pump motor circuit 80 is used for controlling the hydraulics of the shuttle car such as the steering and braking mechanisms and is always kept on once the car is in operation. As shown in FIG. 3, the pump motor circuit 80 comprises a pump motor 82 connected in series with a start-up resistor 84. A pump motor SCR 86 is connected in parallel with the start-up resistor 84. In operation, when the shuttle car is first started, the current to the pump motor 82 is very large as no counter emf has been built up by the pump motor 82. The start-up resistor 84 limits the current to the pump motor 82 during this period. However, after a sufficient period of time, the pump motor 82 is running and the start-up resistor 84 is no longer necessary. The logic circuit 26 then sends a gating pulse to the pump motor SCR 86 which becomes conductive thereby effectively shorting the start-up resistor 84 out of the pump motor circuit 80. This also places the pump motor 82 across full line voltage and it operates in this mode until the car is shut off.

A conveyor motor circuit 90 is also connected across the power supply 20 as shown in FIG. 4. The conveyor motor circuit 90 comprises a conveyor motor 92 in series with a start-up resistor 93. As with the pump motor circuit 80, a conveyor motor SCR 94 is connected in parallel with the start-up resistor 93 and acts to drop the start-up resistor 93 out of the circuit when the SCR 94 receives a gating pulse from the logic circuit 26. A diode 96 is also connected across the conveyor motor 92 and its cathode is connected to the collector of a transistor 97. The base of the transistor 97 is connected to the logic circuit 26 while the emitter is connected through a capacitor 98 to the end of the start-up resistor 93 opposite the conveyor motor 92. A second SCR 101 has its anode connected to the capacitor 98 end of the start-up resistor 93. The cathode of SCR 101 is connected to one side of the power supply 20. A third turn-off SCR 103 has its anode connected between the emitter of the transistor 97 and the capacitor 98. The cathode of the turn-off SCR 103 is connected to the cathode of the second SCR 101.

In operation, the conveyor motor 92 is turned on when the logic circuit 26 gates SCR 101 making it conductive, and turns the transistor 97 on. A current path is, therefore, provided from one side of the power supply 20 through the conveyor motor 92, through the start-up resistor 93 and through SCR 101 and back to the opposite side of the power supply 20. At the same time, because the transistor 97 is turned on, capacitor 98 becomes charged to line voltage. As with the pump motor circuit 80, the start-up SCR 94 is gated shortly after a short delay thereby eliminating the start-up resistor 93 from the circuit and placing the line voltage across the conveyor motor 92. The conveyor motor 92 operates in this mode until it is turned off. At that time, the turn-off SCR 103 is gated which discharges the capacitor 98 through SCR 103. This reverse biases SCR 101, and a reverse voltage appears across SCR 101 long enough for that device to block forward voltage. This effectively turns the conveyor motor 92 off. The diode 96 prevents an overshoot at turnoff by clamping the reverse voltage on the capacitor 98 to the line voltage.

As also shown in FIG. 1, a power circuit 110 is connected across the 300 volt power supply 20. The power circuit 110 is used to supply the plus and minus 24 volts used in the logic circuit 26.

Figure 5:
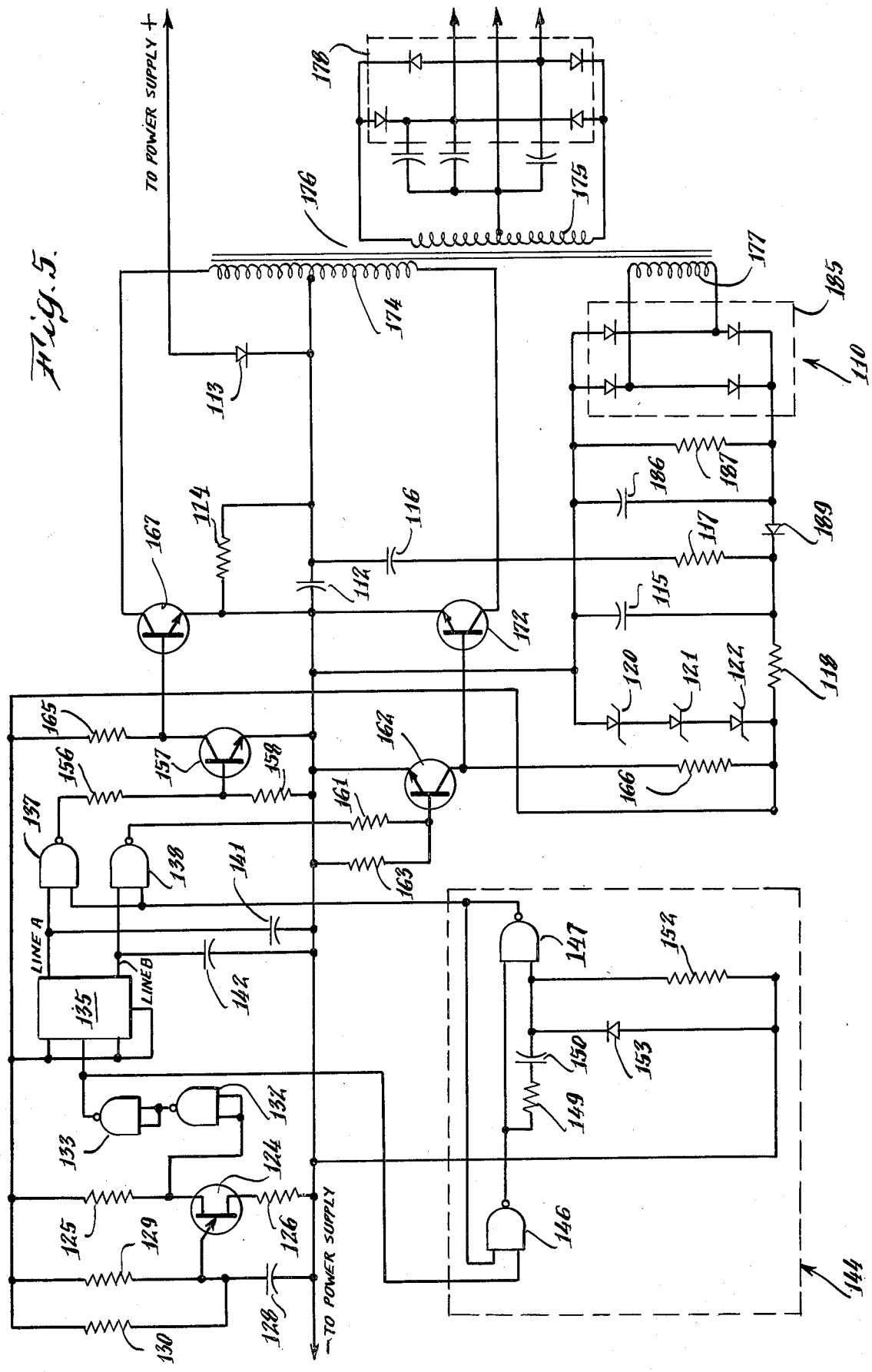
FIG. 5 is a circuit diagram of the power circuit.

A circuit diagram of the power circuit 110 is shown in FIG. 5 and it operates in the following manner. One side of a charging capacitor 112 is connected to the negative side of the power supply 20 while the other side of the charging capacitor 112 is connected through a diode 113 to the opposite or positive side of the power supply 20. Accordingly, the line voltage initially charges the capacitor 112, and as it charges it causes a current flow in a second capacitor 116 one side of which is connected between the charging capacitor 112 and the diode 113. The other side of the capacitor 116 is connected in series with a pair of resistors 117, 118.

Three zener diodes 120, 121 122 are connected in series so that the cathode of the third zener diode 122 is connected to the second of the pair of resistors 117, 118 while the anode of the first zener 120 is connected to the negative side of the power supply 20. As the capacitor 112 charges, the zeners 120, 121, 122 operate in the avalanche mode, and a plus 15 volts is produced on the cathode of the third zener diode 122. This voltage is fed to the rest of the logic of the power supply circuit 110.

The 15 volts from the zener diode 122 is first applied to a unijunction transistor 124 which is configured as an oscillator. Base two of the unijunction transistor 124 is connected through a resistor 125 to the 15 volt line from the third zener diode 122. Base one of the unijunction transistor 124 is connected through another resistor 126 to the positive side of the power supply 20 which, as previously explained, is also connected to the anode of the first zener diode 120. The emitter of the unijunction transistor 124 is separated from this return line voltage by a capacitor 128. At the same time, the emitter is also connected to the 15 volt line from the third zener diode 122 through an emitter resistor 129. A trim resistor 130 is connected in parallel with the emitter resistor 129.

At start up, this unijunction transistor 124 acts as an oscillator whose frequency is set by the values of the capacitor 128, the trim resistor 130 and the emitter resistor 129 as well as the intrinsic characteristics of the transistor 124. The output of the unijunction transistor 124 which is shown in graph A of FIG. 6 is then inputted into a first NAND gate 132, and the output of this NAND gate 132 is fed into a second NAND gate 133. The signal out of the second NAND gate 133 is shown in graph B of FIG. 6. This output signal of the second NAND gate 133 is in turn used to trigger a flip flop 135 which produces a pair of out of phase complementary pulsetrains as outputs on line A and line B. These outputs of the flip flop 135 change as the pulses from the NAND gate 133 trigger the clock of the flip flop 135. The output of the flip flop 135 on line A is fed into one input of a third NAND gate 137, while the complementary pulsetrain on line B is fed into a fourth NAND gate 138. Line A and line B are individually tied to the negative side of the power supply through a pair of capacitors 141, 142.

The second input to both the third and fourth NAND gates 137, 138 is from a multivibrator 144. The multivibrator 144 is fed by the output from the second NAND gate 133. This signal is inputted into a first multivibrator NAND gate 146. The output from this NAND gate 146 is then placed directly on one of the input pins of a second multivibrator NAND gate 147. At the same time, the first multivibrator NAND gate's 146 output is fed into the other input pin of the second NAND gate 147 through a resistor 149 and capacitor 150 connected in series. This second input pin of the NAND gate 147 is connected through a resistor 152 to the negative side of the power supply 20. This resistor 152 is also connected in parallel with a diode 153 the cathode of which is connected to the NAND gate end of the resistor 152. The output of the second multivibrator NAND gate 147 is fed back into an input of the first multivibrator NAND gate 146 and at the same time inputted into the third NAND gate 137 and fourth NAND gate 138. The combination of the resistors 149 and 152 and the capacitor 150 determine the pulse width of the one-shot multivibrator 144. The respectively multivibrator NAND gates 146, 147 only pulse when the output of the first multivibrator NAND gate 146 is high. Consequently, the output of the multivibrator 144 to the third and fourth NAND gates 137, 138 will be at a frequency of the oscillating frequency of the unijunction transistor 124. Accordingly, the outputs of this pair of NAND gates 137, 138 will be at a frequency of one-half that of the frequency of the oscillating unijunction transistor 124, and will be out of phase as previously explained.

The output of NAND gate 137 is fed through a resistor 156 to the base of a first transistor 157. The base of the first transistor 157 is also connected through a base resistor 158 to the negative side of the power supply 20. The emitter of this first transistor 157 is also connected to the negative side of the power supply 20. Similarly, the output of the fourth NAND gate 138 is connected through a resistor 161 to the base of a second transistor 162. The base of the second transistor 162 is also connected to the negative side of the power supply 20 through a base resistor 163, and the emitter of the second transistor 162 is also connected to that negative line. The collector of both of these transistors 157, 162 are connected, respectively, through a pair of resistors 165 and 166 to the 15 volt line from the third zener diode 122.

The collector of the first transistor 157 is also connected to the base of a third transistor 167. Similarly, the collector of the second transistor 162 is connected to the base of a fourth transistor 172. The emitters of the third and fourth transistors 167, 172 are connected to the negative side of the power supply 20 and their collectors are connected to opposite sides of a primary 174 of a center tapped transformer 176.

In operation, as the output from the NAND gates 137, 138 are normally high, the first and second transistors 157, 162 are turned on which results in a ground on the bases of the third and fourth transistors 167, 172. When negative pulses turn off the first and second transistors 157, 162, this correspondingly will turn on the third and fourth transistors 167, 172. When the third transistor 167 is turned on, its collector voltage goes to zero as shown at time $T_1$ in a comparison of graphs A and B of FIG. 7. After this third transistor 167 is turned off, again at time $T_2$ on FIG. 7, the voltage on its collector gradually returns to approximately the 300 volt level of the power supply 20. Subsequently, the fourth transistor 172 is turned on at $T_3$ when the pulse as shown in graph C of FIG. 7 is received by its base. As a result, an additional 300 volts is generated across the turnedoff transistor 167 because of a mutual flux field set up by the transformer 176 whose center tap is connected to the junction of charging capacitor 112 and the cathode of the diode 113. When the fourth transistor 172 turns off at time $T_4$, the voltage on the collector of the third transistor 167 will return to the 300 volt level as shown in graph A of FIG. 7 and the cycle will begin again. At the same time, the collector voltage of the fourth transistor 172 has the same waveform except that it is 180° out of phase and inverted as compared to that of the collector voltage of the third transistor 167 shown in graph A of FIG. 7. The phase shift is due to the out of phase condition of the outputs from the flip flop 135. Consequently, this sequence of alternately turning on the third and fourth transistors 167, 172 generates an alternating voltage on the primary 174 of the transformer 176. This voltage is then stepped down by a secondary 175 of the transformer 176 and fed into a full wave rectifier 178 and filtered by three capacitors 181, 182, 183. This stepped down and filtered voltage is then fed to the logic circuit 26.

When the capacitor 116 has charged to within 15 volts of the line voltage, the voltage on the third zener diode 122 will decay to zero at a rate determined by the time constant of the pair of resistors 117, 118 and the capacitor 116 thereby cutting off voltage to the logic of the power circuit 110. However, at the same time that the first voltage pulse occurs on the primary 174 of the transformer 176, a corresponding voltage will also be generated on a second primary winding 177 shown in FIG. 3. This voltage is rectified by a full wave rectifier 185 and filtered by a capacitor 186. The capacitor 186 is in parallel with a resistor 187. The voltage developed across this capacitor 186 under this condition will now maintain a current flow through the zener diodes 120, 121, 122 as the capacitor 186 is connected through a diode 189 and resistor 118 to the cathode of the third zener diode 122 while the other side of the capacitor 186 is connected to the anode of the first zener diode 120. Consequently, the plus 15 volts from the cathode of the third zener diode 122 will be available for the logic elements of the power circuit 110 when the charging capacitor 112 is fully charged. At shut down, when the power supply voltage is removed from the power circuit 110, the charging capacitor 112 is discharged through a parallel resistor 114. As a result of this discharging capability, this power supply circuit 110 can be quickly restarted.

The logic circuit 26 is generally comprised of four circuits of standard design well-known in the art. The first circuit merely reads the absolute value of the voltage from the foot switch 27 by use of an amplifier which then triggers a multivibrator circuit creating a pair of identical but out of phase pulsetrains whose frequency is directly proportional to that voltage input. As previously explained, each of these pulsetrains are then fed to different pairs of SCRs of the chopper section 30. The second circuit reads the sign (positive or negative) of the same voltage input and depending on the sign selectively opens one of two paths enabling a pulsetrain to be sent to one of the pairs of SCRs of the reversing section 50. Similarly, a third circuit produces pulses to the SCR of the pump motor circuit 80 after a time daly. The last component circuit of the logic circuit 26 simply opens or inhibits various paths for the available pulses depending upon the status of the operator's control switches (not shown).

Throughout this description it should be obvious that the various circuits involved could be altered to some extent without departing from the spirit and scope of the invention. From the foregoing description, numerous advantages and improvements of the invention will now be apparent to those skilled in the art.

Accordingly, the above description of the invention is to be construed as illustrative only rather than limiting and this invention is limited only by the scope of the following claims.

We claim:

1. A control circuit for a mine shuttle car comprising:
    A. a power supply;
    B. a chopper circuit in series with said power supply, said chopper circuit being comprised of a first SCR connected in series with a second SCR, and a third SCR and a fourth SCR which are also series connected, said first and second SCRs being connected in parallel with said third SCR and a fourth SCR, so that said first SCR and said third SCR are connected to said power supply, a commutation capacitor being connected from between said first SCR and said second SCR to between said third SCR and said fourth SCR so that a pair of alternate current paths are provided, one path being from said first SCR through said commutation capacitor and through said fourth SCR, and the other path being from said third SCR through said commutation capacitor and through said second SCR;
    C. a gating means for producing a number of separate series of gating pulses one series of which simultaneously gates either said first SCR and said fourth SCR or said third SCR and said second SCR, each of said SCRs becoming conductive when gated, the frequency of said series of pulses to said SCRs being selectively variable;
    D. a traction motor in series with said chopper circuit and said power supply, said traction motor operating to drive said shuttle car, and the speed of said traction motor being directly related to the magnitude of the voltage across said motor, and when said control circuit is in operation, said gating means gates said first SCR and said fourth SCR, said commutation capacitor discharges through said gated fourth SCR thereby placing voltage across said traction motor while at the same time current flows from said power supply through said gated first SCR to recharge said commutation capacitor in the opposite polarity, said gating means then gates said third SCR and said second SCR, said commutation capacitor discharges through said gated second SCR thereby placing voltage across said traction motor while at the same time current flows through said gated third SCR recharging said commutation capacitor in its original polarity, this sequence being repeated with the frequency of said gating means' gating pulses being directly proportional to the magnitude of voltage across said traction motor.

2. A control circuit as defined in claim 1 wherein a field inductance is connected in series between said traction motor and said chopper circuit, and a free wheeling diode is connected in parallel across said combination of said traction motor and said field inductance, said traction motor, said free wheeling diode and said field inductance forming an RL loop which generates and maintains a current through said traction motor when neither pair of SCRs of said chopper circuit are conducting.

3. A control circuit as defined in claim 1 wherein each SCR of said chopper circuit has an anode, a cathode and a gate, said gate receiving said gating pulses from said gating means.

4. A control circuit as defined in claim 3 wherein said gating means is connected to each of said SCRs of said chopper circuit through a separate protection circuit, each said protection circuit comprising a transformer having a primary winding and a secondary winding, said secondary winding being connected across said gate and said cathode of said SCR and said primary winding being connected to said gating means and carrying said pulses, said secondary winding being shunted by a diode and a resistor.

5. A control circuit as defined in claim 1 wherein said gating means comprises a chopper logic circuit which produces two identical series of pulses which are out of phase and whose frequency is variable and depends upon the magnitude of an input signal to said chopper logic circuit.

6. A control circuit as defined in claim 5 wherein said input signal to said chopper logic circuit is a variable voltage from an operator controlled foot switch, the frequency of said pulses to said chopper section being directly proportional to the absolute value of said foot switch input voltage.

7. A control circuit as defined in claim 6 wherein said voltage from said foot switch is directly proportional to the amount of movement of said foot switch in either direction from its neutral, no voltage position.

8. A control circuit as defined in claim 2 wherein a reversing circuit is connected in series between said traction motor and said chopper circuit, said reversing circuit is comprised of a fifth SCR in series with a sixth SCR, said fifth and sixth SCRs are connected in parallel to a seventh SCR and an eighth SCR which are also series connected, said fifth SCR and said seventh SCR are also connected to the traction motor side of said chopper circuit while said sixth SCR and said eighth SCR are connected to the chopper circuit side of said traction motor, one side of said field inductance being connected between said fifth and sixth SCRs while the other side of said field inductance is connected between said seventh and eighth SCRs, said reversing circuit thereby forming a pair of current paths from said chopper circuit to said traction motor, one of the paths being from said fifth SCR through said field inductance in a forward direction and through said eighth SCR, the other path being from said seventh SCR through said field inductance in a reverse direction and through said sixth SCR, and when said control circuit is in operation, said gating means gates said fifth SCR and said eighth SCR thereby causing forward current through said field inductance and to said traction motor causing it to operate in a forward mode, said traction motor operating in reverse when said logic circuit shuts off the first path and instead gates said seventh and sixth SCRs thereby creating a reverse current flow through said field inductance causing an opposite current to said traction motor.

9. A control circuit as defined in claim 8 wherein each SCR of said reversing circuit has an anode, a cathode and a gate, said gate receiving a series of gating pulses from said gating means.

10. A control circuit as defined in claim 9 wherein said gating means is connected to each of said SCRs of said reversing circuit through a separate isolating circuit, each said isolating circuit comprising a transformer having a primary winding and a secondary winding, said secondary winding having two ends, one end being connected to said cathode of said SCR, and the other end being connected to said gate through a diode and resistor in series, a shunting resistor being connected across said secondary winding and said diode, and said primary winding being connected to said gating means and carrying said pulses from said gating means.

11. A control circuit as defined in claim 8 wherein said gating means comprises a reversing logic circuit which produces a pulsetrain which is selectively sent to either said fifth SCR and said eighth SCR or to said sixth SCR and said seventh SCR depending upon the polarity of the input voltage to said reversing logic circuit.

12. A control circuit as defined in claim 11 wherein said input voltage is sent from an operator controlled foot switch, the polarity of said input voltage being dependent upon the direction in which said foot switch is moved.

13. A control circuit as defined in claim 1 wherein a pump motor circuit is connected across said power supply, said pump motor circuit comprising a pump motor, which controls the hydraulics of said shuttle car, in series with a start-up resistor which limits the current to said pump motor under start-up conditions, and a pump motor SCR connected in parallel with said start-up resistor, said pump motor SCR being gated by said gating means and becoming conductive thereby shorting out said start-up resistor and placing full line voltage across said pump motor after a start-up time has elapsed.

14. A control circuit as defined in claim 13 wherein said gating means comprises a pump motor logic circuit which gates said pump motor SCR after a set time delay after said shuttle car is turned on.

15. A control circuit as defined in claim 1 wherein a conveyor motor circuit is connected across said power supply, said conveyor motor circuit comprising a conveyor motor, said conveyor motor having a conveyor motor start-up resistor in series with it, said conveyor motor start-up resistor limiting the current to said conveyor motor under start-up conditions, a conveyor motor SCR connected in parallel with said conveyor motor start-up resistor, said conveyor motor SCR being gated by said gating means after a start-up time has elapsed thereby shorting out said conveyor motor start-up resistor, said conveyor motor also being in series with a ninth SCR and connected to one side of said conveyor motor start-up resistor opposite said conveyor motor, said ninth SCR being gated when said conveyor motor is turned on, said ninth SCR being connected in parallel to a tenth SCR in series with a charging capacitor, said charging capacitor becoming charged to line voltage when said conveyor motor circuit is on, means for charging said capacitor, said conveyor motor being turned off when said gating means gates said tenth SCR thereby discharging said capacitor which reverse biases said ninth SCR making it nonconductive and breaking the line to said power supply.

16. A control circuit as defined in claim 15 wherein said means for charging comprises a transistor having a base, an emitter and a collector, said base being connected to said gating means, said emitter being connected to the tenth SCR side of said capacitor and said collector being connected to said power supply, said transistor being turned on when said base receives a signal from said gating means thereby making the collector side of said capacitor effectively connected to said power supply.

17. A control circuit as defined in claim 16 wherein said gating means comprises a conveyor logic circuit which produces pulses and selectively gates said ninth SCR and said base of said transistor when said conveyor motor is turned on, and after a time delay selectively gates said conveyor motor SCR, and when said conveyor motor is turned off, said conveyor logic circuit sends said pulses to gate said tenth SCR.

18. A control circuit as defined in claim 1 wherein a filter capacitor is connected across said power supply and an inductance is connected in series between said power supply and said chopper circuit.

19. A control circuit as defined in claim 8 wherein said control circuit comprises a pump motor circuit and a conveyor motor circuit connected across said power supply, said control circuit also having a power circuit across said power supply, said power circuit supplying said gating means with a DC voltage, said gating means comprising a single logic circuit for supplying the proper pulses to said chopper circuit, said reversing circuit, said pump motor circuit and said conveyor circuit.

* * * * *

UNITED STATES PATENT AND TRADEMARK OFFICE
CERTIFICATE OF CORRECTION

PATENT NO. : 4,118,658            Page 1 of 2

DATED : October 3, 1978

INVENTOR(S) : John P. Salva, Gregory M. Mudzinski, John A. Mills and Shashi B. Dewan It is certified that error appears in the above-identified patent and that said Letters Patent are hereby corrected as shown below:

Column 2, line 10, "directin" should be --direction--.

Column 4, line 14, "SCR" should be --SCRs--.

Column 5, line 16, insert --32-- after "SCR" and before "in".

Column 7, line 20, "blockiing" should be --blocking--.

Column 9, line 62, "respectively" should be --respective--.

Column 11, line 38, "daly" should be --delay--.

UNITED STATES PATENT AND TRADEMARK OFFICE
CERTIFICATE OF CORRECTION

PATENT NO. : 4,118,658

DATED : October 3, 1978

INVENTOR(S) : John P. Salva, Gregory M. Mudzinski, John A. Mills and Shashi B. Dewan It is certified that error appears in the above-identified patent and that said Letters Patent are hereby corrected as shown below:

Column 14, line 29 (claim 15, line 20), insert --and-- after "capacitor," and before "said".

Column 14, line 36 (claim 16, line 2), insert --said capacitor-- after "charging" and before "comprises".

Signed and Sealed this

Thirtieth Day of January 1979

[SEAL]

Attest:

RUTH C. MASON
Attesting Officer

DONALD W. BANNER
Commissioner of Patents and Trademarks